Oct. 19, 1965  R. HASSA  3,212,751
VALVE AND PERMANENT MAGNET
Filed Sept. 4, 1962  3 Sheets-Sheet 1

INVENTOR:
RICHARD HASSA
BY
Darby, Robertson + Vanderburgh
ATT'YS

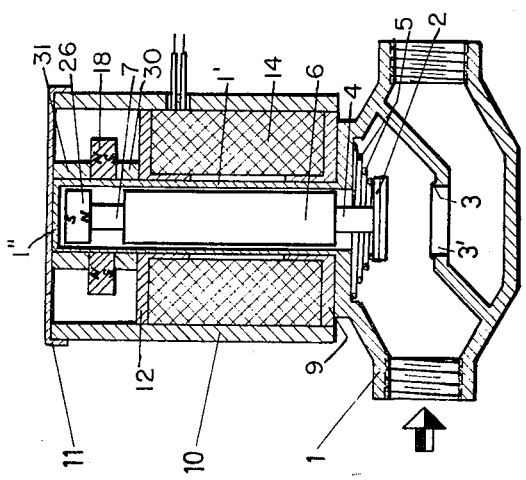
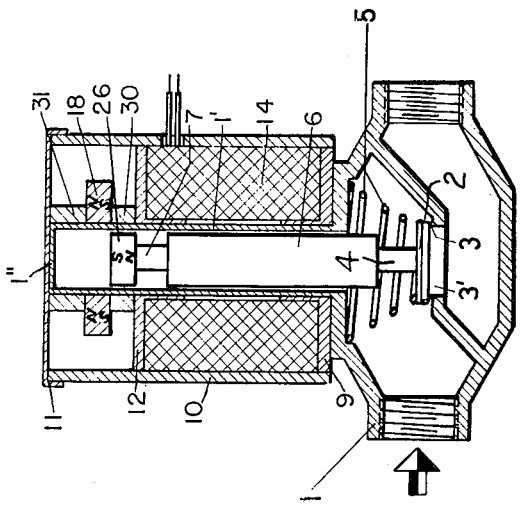

United States Patent Office 3,212,751
Patented Oct. 19, 1965

3,212,751
VALVE AND PERMANENT MAGNET
Richard Hassa, Osnabruck, Germany, assignor to G. Kromschröder Aktiengesellschaft, Osnabruck, Germany
Filed Sept. 4, 1962, Ser. No. 220,990
Claims priority, application Austria, Sept. 4, 1961, 6,739/61
7 Claims. (Cl. 251—65)

The invention relates to a valve for the control or regulation of a fluid through a pipe line. The valve is of the kind having a stem guided in an impervious sleeve of non-magnetic material and having adjacent to the outer end of the stem a permanent magnet whose center surrounds the sleeve and which is movable in relation to the valve stem.

In a known type of valve of this kind there is a piston which constitutes both a loading and a closing means for an auxiliary valve as well as a freely suspended valve stem of the auxiliary valve but does not leave in any of its possible positions the field of force of the permanent magnet. Moreover, the known valve for which is needed an auxiliary valve body extraneous to that forming the subject of the present invention, is not a quick-closing valve.

A further known type of valve has no opposing permanent magnet arranged in opposing polarity to its permanent magnet, as is a feature of the valve of the present invention. A disc-form element on the outer end of the valve stem acts in effect as an armature; which is movable by the valve stem in relation to a disc-like element attached to the valve housing, which however is of non-magnetic material. Apart from that, the permanent magnet, which is movable in a relatively small range, serves quite a different purpose from that of the permanent magnet of the present invention, namely to achieve an increase or decrease in the counterforce due to the weight of the valve stem directed to closing the valve, also the armature on the outer end of the valve stem does not, as in the present invention, leave the field of force of the permanent magnet in any of its possible positions.

A further known type of valve having snap-action has two permanent magnets, which have yoke-formed pole pieces, between which as representing the outer end of the valve stem is a movably arranged disc of magnetic material within an impervious housing. The position of the two permanent magnets with their rigidly attached yoke-formed pole pieces can indeed be changed in relation to this housing or to the disc of magnetic material through a relatively small distance, so that the magnetic attraction exerted by either the upper or the lower parts of the pole pieces respectively predominates. The said disc thus adheres either to the lower parts of the pole pieces (valve closed) or to their upper parts (valve open), but in no case leaves the field of force of the two permanent magnets.

The object of the present invention is to provide a valve of the kind described which eliminates the disadvantages of the above mentioned known valves and yet is of simpler construction.

According to the invention the valve is characterized in that the magnetic or magnetizable outer end of the valve stem upon moving from one end position to the other moves so far past the permanent magnet—or the permanent magnet moves past the outer end of valve stem—if necessary against the effect of a return force, that in at least one end position the outer end of the valve stem leaves the magnetic field of force of the permanent magnet.

It will be obvious that the valve in accordance with the present invention is essentially simpler in construction, if only because its permanent magnet is in one piece, no yoke-formed pole pieces being needed and no means to hinder turning of the permanent magnets and since the central sleeve surrounded by the permanent magnet can be made more simply for production and assembly. Moreover only by means of the arrangement in accordance with the present invention, namely by having the outer end of the valve stem leave the field of force of the permanent magnet in at least one end position, can the requirement be met whereby in a specially advantageous embodiment hereinafter described, it can also be used as an electromagnetically operated control valve.

The present invention overcomes the shortcomings of the known types of valve and provides a quick closing valve with one permanent magnet. In the invention this is achieved in that the magnetic or magnetizable outer end of the valve stem upon moving from one end position to the other moves so far past the permanent magnet—or the permanent magnet moves so far past the outer end of the valve stem—if necessary against a return force, that in at least one end position the outer end of the valve stem leaves the magnetic field of force of the permanent magnet.

A feature according to a further embodiment of the invention consists in that the permanent magnet is located in a recess, preferably cup-shaped, in a press-button coaxially movable in relation to the valve stem and made of non-magnetic material and that the permanent magnet or the part of the press-button holding it is spaced in relation to a stop on the valve housing, for example its cover, that on the permanent magnet returning towards its outer end position the outer end of the valve stem first abuts against the sleeve and only drops when the press-button is brought to its outer end position.

A further advantageous feature of the invention consists in that the outer end of the valve stem is formed as an armature to the peramnent magnet and moves out of effective range of the magnet when the press-button is moved to its outer end position, and further that the permanent magnet is acted upon by a return spring whose other end abuts on the stop on the valve housing.

A further feature of the invention consists in that the return spring is so dimensioned as to hold the permanent magnet in such a position in relation to the attracted armature of the valve stem as to make the valve stem in its outer end position come to rest at or near to a stop on the sleeve. With the latter arrangement there may be provided an electromagnet adapted to act as a controllable quick closing valve and having advantages corresponding to the former embodiment. For instance: On failure of current the press-button is to be pushed in and released thereby bringing the outer armature into relation with the permanent magnet and holding the gas valve open in the absence of current. In case of continued absence of current and on a predetermined temperature being reached, the press-button is pulled into its outer end position to shut off the gas. In accordance with the invention this is made possible by joining the part of the valve stem formed as armature to the electromagnet to the part of the valve stem associated with the permanent magnet by a non-magnetizable connecting piece, the field strength of the electromagnet being greater than that of the permanent magnet and the return spring being so formed that, on the armature being attracted by the electromagnet it holds the permanent magnet in the press-button beyond effective range of the armature on the valve stem.

Another feature of the invention consists in forming the outer end of the valve stem as a permanent magnet whose poles are opposed to the like poles of the permanent magnet in the press-button, so that the two magnets are held in their respective end positions by the repelling force of the like poles facing one another. By this arrangement provision of a return spring can be dispensed with.

A still further feature of the invention insofar as the valve may be used as a controllable electromagnetic valve consists in that the permanent magnet is fixedly located; the part of the valve stem formed as the armature of the electromagnet is joined to the part of the valve stem associated with the permanent magnet by a non-magnetizable connecting piece; the field strength of the electromagnet is greater than that of the permanent magnet, and the outer magnetic end of the valve stem has its poles opposed to the like poles of the permanent magnet and is movable axially outwards through it, so that the two magnets are held in their respective end positions by the repelling force of the like poles facing one another. Moreover, the spacing between the inner surface of the opposing permanent magnet on the valve stem and that of the opposite facing outer surface of the electromagnet, with valve closed and returning energizing current, is sufficient to prevent interference with the effect of the electromagnet and the permanent magnet on the end of the valve stem, and finally a spring is so arranged between the valve plate and the valve housing and is so dimensioned that on cessation of energizing current it can draw the opposing permanent magnet on the valve stem out from its outer end position.

The term "magnetic" as used herein is intended to refer to ferromagnetic materials, both those materials such as soft iron which may be only temporarily magnetized by means of exterior magnetic field, as well as those materials such as steel or Alnico which may be permanently magnetized.

In order that the invention may be more clearly understood various embodiments thereof, as applied to valves for controlling or regulating the flow of gas through a pipe line, will now be described, by way of example, with reference to the accompanying drawings in which all figures show the valve in axial section and in which:

FIG. 8 is a cross-section of still another embodiment of a quick closing valve assembly according to the invention in closed position, and having two permanent magnets and an additional electromagnet; and FIG. 9 is a cross-section of the valve assembly shown in FIG. 8 in open position.

Figure 1:
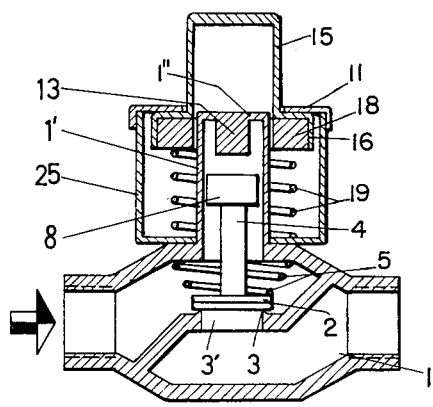
FIG. 1 is a cross-section showing a valve assembly according to the invention in closed position.

Referring to those drawings the valve comprises a valve housing 1, valve plate 2, valve seat 3, and valve port 3' opened or closed by said valve plate 2 on axial movement by its valve stem 4. The valve plate 2 is held on its seat 3 by a spring 5 (FIGURES 1 to 5 and 8 and 9) located between said valve plate and the valve housing 1, the valve stem 4 is axially movable within a sleeve 1' of non-magnetic material formed on the valve housing 1. The sleeve 1' is housed in a casing 25 mounted on the valve housing 1 and is closed at its outer end by an impervious top 1" and is in communication at its opposite or inner end with the space above valve seat 3.

The outer end of valve stem 4 is in the form of an armature 8 (FIGURES 1 to 5) or as an opposing permanent magnet 26 (FIGURES 6 to 9), in relation to the permanent magnet 18 which surrounds the sleeve 1' by which the stem 4 is guided. Projecting through a cover 11 of the auxiliary casing 25 and coaxial with valve stem 4 is a press-button 15 (FIGURES 1 to 5) or 15' (FIGURES 6 and 7) having its outward movement limited by the cover 11 and supporting in a recess formed by an inner cupped portion 16 (FIGURES 1 to 7) a permanent magnet 18. The permanent magnet 18 is acted on either by return spring 19 (FIGURES 1 to 5) whose other end rests on the base of the casing 25, or to the opposing force of permanent magnet 26 (FIGURES 6 to 9) attached to valve stem 4, whose poles oppose the like poles of permanent magnet 18.

In the embodiments of FIGURES 3 to 5 and 8 and 9 a part 6 of valve stem 4 forms the armature of a magnetic coil 14. Said armature 6 is separated from the armature 8 (FIGURES 3 to 5) or opposing permanent magnet 26 (FIGURES 8 and 9) by a non-magnetic connecting piece 7. The magnetic coil 14 surrounds the sleeve 1' and is positioned between an inner magnetic force insulating disc 9 on the valve housing 1 and an outer like insulating disc 12, conductively connected by the tubular casing 10. The upper end of casing 10 also houses permanent magnet 18 and the outer portion of sleeve 1'. The outer end of casing 10 is closed by a cover 11.

In FIGURES 1 to 7 the cover 11 centrally surrounds press-button 15, 15' which is made of plastic or other non-magnetic material, and serves as a stop to outward movement of the cup-shaped part 16 of the press-button which houses permanent magnet 18. The sleeve top 1" has a stop 13 limiting outward movement of valve stem 4.

In FIGURES 8 and 9 the axially movable permanent magnet 18 is fixedly located between two distance pieces 30, 31 the inner one 30 of which abuts at its inner end on outer isolating disc 12 and the outer one 31 at its outer end abuts on the cover 11 of the tubular casing 10.

Figure 2:
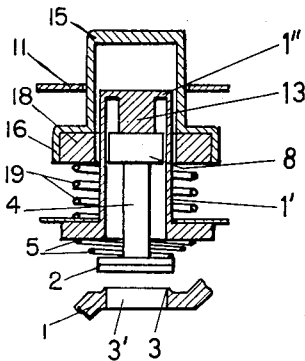
FIG. 2 is a portion of the valve assembly shown in FIG. 1 but in open position.

The operation of valves according to the invention is as follows:

In the embodiment according to FIGURES 1 and 2 the valve stem 4, under the influence of permanent magnet 18, takes up the operating position shown in FIGURE 2, abutting against stop 13 or to a position dictated by the strength of return spring 19 of permanent magnet 18. If the valve shuts off the gas supply, for example on the desired temperature being reached in the space to be heated, then the press-button 15 is brought outwards only to such an extent that the permanent magnet 18 moves out of the effective range of the armature 8. The valve stem 4 then falls, aided by the action or return spring 5, and valve plate 2 is seated on valve seat 3 and at once closes the valve port 3' (FIGURE 1). To open valve port 3', it is necessary only to press the press-button 15 fully in against its return spring 19 and then release it. Permanent magnet 18 is then at once raised by return spring 19 and moves up with it the armature 8 and valve stem 4 against the action of spring 5 to the open position shown in FIGURE 2. If the valve is to be closed again, the press-button 15 is to be pulled outwards until it engages cover 11 where it is held by the return spring 19.

Figure 5:
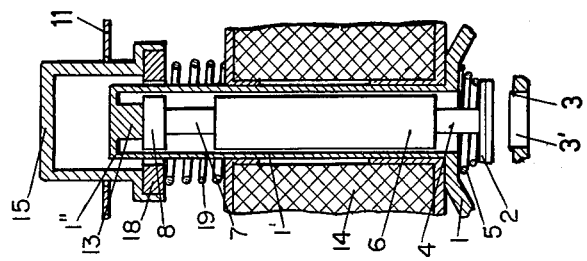
FIG. 5 is a cross-section of a portion of the valve assembly shown in FIG. 3 in fully open position.
Figure 4:
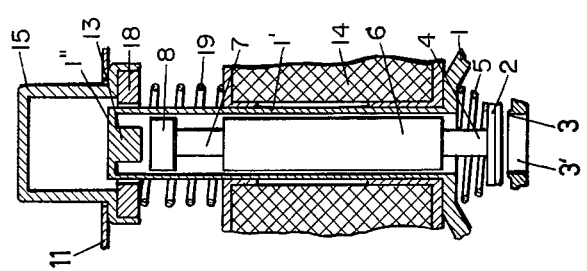
FIG. 4 is a cross-section of a portion of the valve assembly shown in FIG. 3, but in partially open position.
Figure 3:
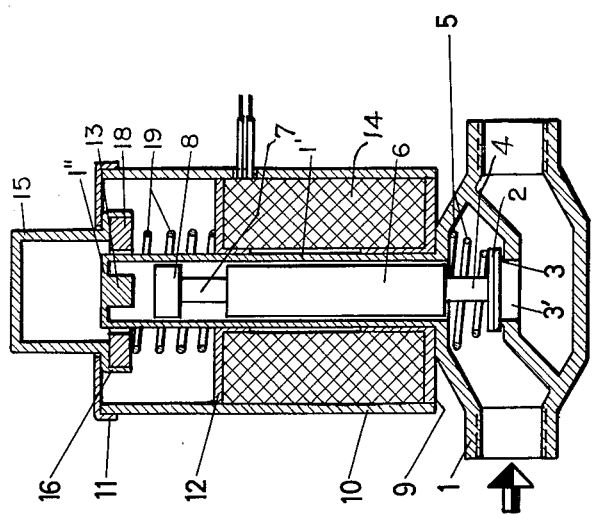
FIG. 3 is a cross-section of another embodiment of the valve assembly having an additional electromagnet, the valve being in closed position.

The embodiments according to FIGURES 3 to 5 differ from those already described in having an additional electromagnet 14, which alone when energized is capable of holding armature 6 (and thus valve stem 4 and valve plate 2) in the displaced position. The valve according to this embodiment can thus also be used as a control valve by providing for the switching on and off of the energizing current by a thermostat.

In FIGURE 4 the valve plate 2 under the influence of energized electromagnet 14 has automatically opened valve port 3'. Upon cessation of energizing current however it moves at once and automatically to the closed position (FIGURE 3) and does this also when the press-button 15 is moved outwards from the position shown in FIGURE 5, in which the outer armature 8 is held by permanent magnet 18 against cover 11 and thereby brings permanent magnet 18 out of the effective range of armature 8. If, even in the absence of current, it is desired to open the closed valve (FIGURE 3) again, it is necessary only to press in fully the press-button 15 and then release it. The valve then moves automatically into the position shown in FIGURE 5 and remains there. On the restoration of current, the valve automatically resumes the position shown in FIGURE 4.

If, however, the current remains off and valve stem 4 remains at its outer end position in which its armature 8 is held by permanent magnet 18, the gas supply can then—as already indicated—be cut off at any time simply by pulling the press-button outwards. Permanent magnet 18 then moves out of range of the outer armature 8 and the valve plate 2, under the action of spring 5, moves at once to the closed position shown in FIGURE 3.

Figure 6:
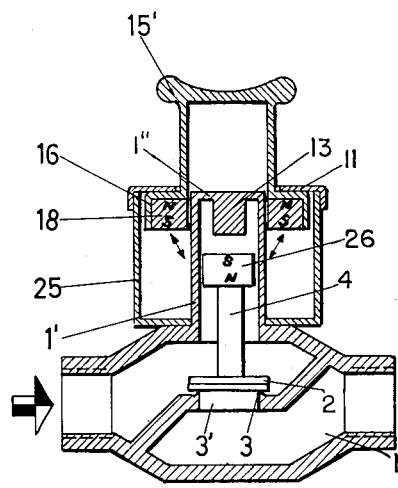
FIG. 6 is a cross-section of still another embodiment of the valve assembly of the quick closing type provided with two permanent magnets, the valve assembly being shown in closed position.
Figure 7:
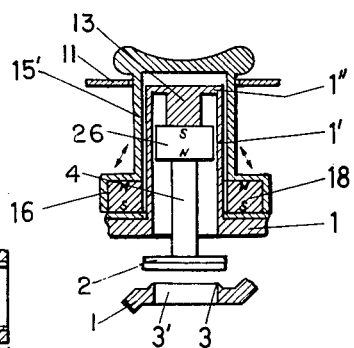
FIG. 7 is a cross-section of the valve assembly shown in FIG. 6 in open position.

In the embodiment of FIGURES 6 and 7 when the valve is closed (FIGURE 6), press-button 15' is in its outer end position and is held there by the opposing south poles of permanent magnets 18, 26. To open the valve it is necessary to simply press in press-button 15' to its other end position and then release it. Press-button 15' then remains in its inner end position, held by the force of the now opposing north poles, with magnet 26 engaging stop 13 (FIGURE 7) holding the valve open and freely letting through the flowing gas. To bring the valve from the open position of FIGURE 7, to the closed position of FIGURE 6 it is necessary only to pull press-button 15' outwards against the force of opposing permanent magnets 18, 26 to its outer end position abutting cover 11. There it remains with its permanent magnet 18 held in its cup-shaped portion and in that position keeps the valve body 2 closed by the force of the now opposing South poles of permanent magnets 18, 26.

In FIGURES 8 and 9 valve 2 is closed (FIGURE 8) on seat 3 as electromagnet 14 is not energized and as the opposing South poles of the permanent magnets 18, 26 exert a closing force. In addition, spring 5 between valve plate 2 and housing 1 together with the pressure of the controlled gas flow act on valve body 2 to keep it closed. On energizing electromagnet 14, its armature 6 is attracted against the aforementioned forces and pulls away the opposing permanent magnet 26 attached to armature 6 by non-magnetic connecting piece 7, through the permanent magnet 18 located by the distance pieces 30, 31. The valve is then open (FIGURE 9) and valve plate 2 remains in the open position, held there by the energized electromagnet 14 and the now opposing North poles of permanent magnets 18, 26 against the then operating counterforce of spring 5. To close the valve from position of FIGURE 9 to position of FIGURE 8, the energizing current is cut off, for example by a thermostat. The strength of spring 5 then overcomes the force of opposing North poles and returns valve plate 2 to its seating, aided by the then opposing South poles. On restoration of the energizing current, the controllable on-off valve opens as already described.

The valve of FIGURES 8 and 9 can indeed not be opened—in contrast to the earlier described embodiments—so long as energizing current is absent. Because the attracted armature 6 has its whole length in the field of excitation and is held there by the opposition of the two North poles, an electromagnet 14 energized by alternating current is hum-free or nearly so.

What is here claimed is:

1. A valve assembly comprising a housing having fluid inlet and outlet and a passageway therebetween, said housing defining a valve seat surrounding a portion of said passageway, a fluid impervious sleeve of a non-magnetic material mounted on said housing with the interior of the sleeve in communication with said passageway and aligned with said portion of said passageway, a valve movably mounted in said housing and sleeve and including a valve plate in juxtaposition to said seat and a valve stem connected thereto and extending into said sleeve and a magnetic member at the outer end of the stem opposite said plate, an annular magnetic member surrounding said sleeve and movable longitudinally along the sleeve, one of said members being a permanent magnet, a press-button composed of non-magnetic material slidably mounted about said sleeve for movement therealong, said button having a cup-shaped recess within which said annular member is mounted, a press-button stop mounted on said housing, said sleeve having limiting means at its outer end for limiting the outer movement of said valve, said annular member and said press-button containing said annular member being so arranged that when said annular member is returned to its outer limiting position determined by said press-button stop, the magnetic member of said valve abuts against said limiting means until it no longer is in the effective magnetic field of said permanent magnet, whereby said valve is released and permitted to close.

2. A valve assembly in accordance with claim 1 wherein the outer end of said valve stem comprises an armature composed of a magnetic material cooperating with said permanent magnet, and wherein said armature moves out of the magnetic field of said permanent magnet when the press-button is moved to its outer end position, and wherein said permanent magnet is biased by a spring to return position, the other end of said spring abutting said housing.

3. A valve assembly in accordance with claim 2 wherein said return spring is so dimensioned as to hold the permanent magnet in a position in relation to the attracted armature of the valve stem such as to make the valve in is outer end position come to rest at a limiting means provided on said sleeve in which said valve stem is guided.

4. A valve in accordance with claim 1 wherein a portion of said valve stem comprises an armature mounted within an electromagnet and joined to the part of the valve stem associated with the magnetic member by a non-magnetic connecting member, wherein the field strength of said electromagnet upon activation is greater than that of said permanent magnet, and wherein said permanent magnet is biased by a return spring to return position, the return spring being so formed that when said armature is attracted by said electromagnet, the return spring holds the permanent magnet in the press-button beyond the effective range at which the permanent magnet can move the armature on the valve stem.

5. A valve assembly comprising a housing having fluid inlet and outlet and a passageway therebetween, said housing defining a valve seat surrounding a portion of said passageway, a fluid impervious sleeve of a non-magnetic material mounted on said housing with the interior of the sleeve in communication with said passageway and aligned with said portion of said passageway, a valve movably mounted in said housing and sleeve and including a valve plate in juxtaposition to said seat and a valve stem connected thereto and extending into said sleeve and a valve magnetic member at the end of the stem opposite said plate and an armature between said member and said plate, an annular magnetic member surrounding said sleeve, one of said members being a permanent magnet, said members being normally positioned so that when said plate is on said seat the other of said members is out of the effective magnetic field of said one member, and means to move said valve so that the plate moves from said seat and said valve member moves toward said annular member, said means including an annular electromagnet mounted on said body and positioned about said armature to exert a direct pull on said armature when said electromagnet is energized.

6. A valve assembly as set forth in claim 5, wherein both of said members are magnets having like poles positioned with the opposite orientation and positioned so that when said valve is closed the pole of one polarity on a first of the members is adjacent the pole of the same polarity on the second of the members, said members being of a size such that when said electromagnet opens said valve the pole of the opposite polarity of the first member is adjacent the pole of the same polarity of the second member, whereby the two magnets are held in the respective end positions by the repelling force of the like poles adjacent each other.

7. A valve assembly as set forth in claim 5, including a press-button mounted for movement longitudinally along said sleeve, said annular member being affixed to said press-button and forming a unit therewith, resilient means bearing against said unit and urging said unit in a direction away from said seat.

References Cited by the Examiner

UNITED STATES PATENTS

| | | | |
|---|---|---|---|
| 2,289,574 | 7/42 | Carlson | 251—65 |
| 2,700,395 | 1/55 | Young | 251—65 X |
| 2,752,936 | 7/56 | Cantalupo | 251—65 X |
| 2,942,837 | 6/60 | Bauerlein | 251—65 |

M. CARY NELSON, *Primary Examiner.*